(12) United States Patent
Yoon et al.

(10) Patent No.: US 9,515,704 B2
(45) Date of Patent: Dec. 6, 2016

(54) WIRELESS ENERGY RECEIVING APPARATUS AND METHOD, AND WIRELESS ENERGY TRANSMITTING APPARATUS

(71) Applicant: Samsung Electronics Co., Ltd., Suwon-si (KR)

(72) Inventors: Seung Keun Yoon, Seoul (KR); Ui Kun Kwon, Hwaseong-si (KR); Sang Joon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 676 days.

(21) Appl. No.: 13/747,681

(22) Filed: Jan. 23, 2013

(65) Prior Publication Data
US 2013/0270920 A1 Oct. 17, 2013

(30) Foreign Application Priority Data

Apr. 12, 2012 (KR) .......................... 10-2012-0037690

(51) Int. Cl.
*H04B 5/00* (2006.01)
*H02J 17/00* (2006.01)

(52) U.S. Cl.
CPC ............. *H04B 5/0037* (2013.01); *H02J 17/00* (2013.01); *H04B 5/00* (2013.01); *H04B 5/0093* (2013.01)

(58) Field of Classification Search
CPC ........... H04B 5/00; H04B 5/0093; H02J 17/00
USPC ........................................................ 307/104
See application file for complete search history.

(56) References Cited

U.S. PATENT DOCUMENTS

| 7,741,734 | B2 | 6/2010 | Joannopoulos et al. | |
| 8,922,329 | B2* | 12/2014 | Davis | H02J 7/025 320/108 |
| 2008/0231120 | A1* | 9/2008 | Jin | H02J 5/005 307/104 |
| 2009/0284220 | A1* | 11/2009 | Toncich | G06K 7/0008 320/108 |
| 2009/0286475 | A1* | 11/2009 | Toncich | G06K 7/0008 455/41.1 |
| 2010/0148723 | A1* | 6/2010 | Cook | G06K 7/0008 320/108 |
| 2010/0190436 | A1* | 7/2010 | Cook | H04B 5/00 455/41.1 |

(Continued)

FOREIGN PATENT DOCUMENTS

KR 10-2011-0134969 A 12/2011
KR 10-2011-0139560 A 12/2011

(Continued)

*Primary Examiner* — Adi Amrany
(74) *Attorney, Agent, or Firm* — NSIP Law

(57) ABSTRACT

An apparatus and a method for wirelessly receiving and transmitting energy are provided. A wireless energy receiving apparatus in a terminal configured to wirelessly receive energy through mutual resonance between a resonator of an energy supply apparatus configured to supply the energy and a resonator of the terminal, includes an energy measuring unit configured to measure an amount of energy stored in the terminal. The wireless energy receiving apparatus further includes a control unit configured to change a state of the resonator of the terminal from a non-resonant state to a resonant state when the measured amount of energy is less than or equal to a predetermined threshold.

20 Claims, 15 Drawing Sheets

(56) References Cited

U.S. PATENT DOCUMENTS

| | | |
|---|---|---|
| 2010/0256831 A1 | 10/2010 | Abramo et al. |
| 2010/0277003 A1* | 11/2010 | Von Novak ............. H01F 38/14 307/104 |
| 2011/0053500 A1* | 3/2011 | Menegoli ................ H02J 5/005 455/41.1 |
| 2011/0187320 A1 | 8/2011 | Murayama |
| 2011/0260549 A1 | 10/2011 | Jung et al. |
| 2011/0279244 A1 | 11/2011 | Park et al. |
| 2012/0038220 A1* | 2/2012 | Kim ....................... H02J 7/025 307/104 |
| 2012/0112555 A1* | 5/2012 | Toshimitsu ............ H02J 17/00 307/104 |
| 2012/0202435 A1* | 8/2012 | Kim .................... H04B 5/0093 455/69 |
| 2012/0307873 A1* | 12/2012 | Kim ..................... H04B 5/0031 375/219 |
| 2013/0119781 A1* | 5/2013 | Takada .................. B60L 11/182 307/104 |
| 2013/0176652 A1* | 7/2013 | Kim ........................ H02H 3/20 361/86 |
| 2013/0176653 A1* | 7/2013 | Kim ........................ H02H 9/04 361/91.6 |
| 2013/0234527 A1* | 9/2013 | Ishihara ............... H04B 5/0037 307/104 |

FOREIGN PATENT DOCUMENTS

| | | |
|---|---|---|
| KR | 10-2012-0017526 A | 2/2012 |
| KR | 10-2012-0019216 A | 3/2012 |

* cited by examiner

Resonant state

Non-resonant state

WIRELESS ENERGY RECEIVING APPARATUS AND METHOD, AND WIRELESS ENERGY TRANSMITTING APPARATUS

CROSS-REFERENCE TO RELATED APPLICATION(S)

This application claims the benefit under 35 U.S.C. §119 (a) of Korean Patent Application No. 10-2012-0037690, filed on Apr. 12, 2012, in the Korean Intellectual Property Office, the entire disclosure of which is incorporated herein by reference for all purposes.

BACKGROUND

1. Field

The following description relates to an apparatus and a method for wirelessly receiving and transmitting energy.

2. Description of Related Art

Various mobile devices, such as a smart phone, a tablet personal computer (PC), and a laptop computer, are increasing in numbers. With the development of near field communication technologies, such as a wireless local area network (LAN) and Bluetooth, systems increasingly operate by constructing a single application in several mobile devices in addition to exchanging information between mobile devices of the same user or other users. Most of the systems include a mobile device. A battery of the mobile device may have a limited charge capacity, and may require frequent charging in comparison to a conventional device. Near field wireless power transmission may be one method of resolving such issues.

SUMMARY

In one general aspect, there is provided a wireless energy receiving apparatus in a terminal configured to wirelessly receive energy through mutual resonance between a resonator of an energy supply apparatus configured to supply the energy and a resonator of the terminal, including an energy measuring unit configured to measure an amount of energy stored in the terminal. The wireless energy receiving apparatus further includes a control unit configured to change a state of the resonator of the terminal from a non-resonant state to a resonant state when the measured amount of energy is less than or equal to a predetermined threshold.

In another general aspect, there is provided a wireless energy transmitting apparatus in a terminal configured to wirelessly transmit energy through mutual resonance between a resonator of the terminal and a resonator of an energy receiving apparatus configured to receive the energy, the wireless energy transmitting apparatus including a detecting unit configured to detect the energy receiving apparatus based on a change in a waveform of energy stored in the terminal. The wireless energy transmitting apparatus further includes a control unit configured to calculate a predetermined threshold based on a frequency that the terminal comes into contact with the detected energy receiving apparatus, a charging capacity of the detected energy receiving apparatus, and an energy consumption rate of the detected energy receiving apparatus, the predetermined threshold being used to change a state of the resonator of the detected energy receiving apparatus from a non-resonant state to a resonant state.

In still another general aspect, there is provided a wireless energy receiving method in a terminal configured to wirelessly receive energy through mutual resonance between a resonator of an energy supply apparatus configured to supply the energy and a resonator of the terminal, the wireless energy receiving method including measuring an amount of energy stored in the terminal. The wireless energy receiving method further includes changing a state of the resonator of the terminal from a non-resonant state to a resonant state when the measured amount of energy is less than or equal to a predetermined threshold.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Figure 1:
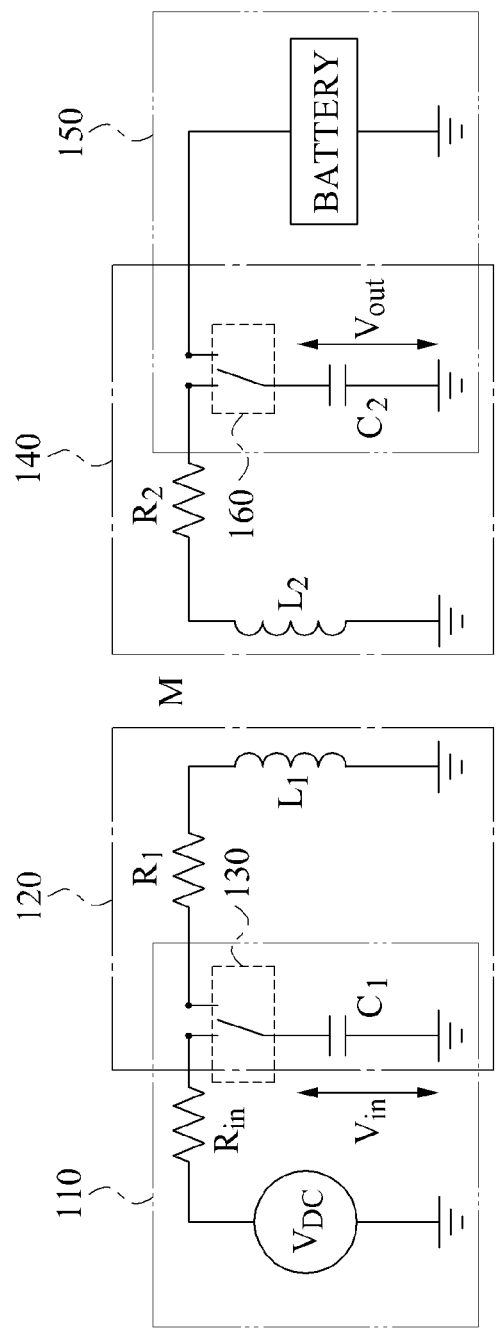
FIG. 1 is a diagram illustrating an example of an equivalent circuit of a wireless energy transmission and reception system.

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Near field wireless power transmission refers to wireless power transmission when a distance between a transmission coil and a reception coil is sufficiently short compared to a wavelength in an operation frequency. For example, a wireless power transmission and reception system using a resonance characteristic includes a source device configured to supply power, and a target device configured to receive the supplied power. The wireless energy transmission and reception system may be used to remotely control an information storage device without a power source. The wireless energy transmission and reception system may supply power to the information storage device to remotely operate the information storage device, and to wirelessly request information stored in the information storage device.

The wireless energy transmission and reception system stores energy in a source resonator. The energy is supplied from a power supply unit, such as an external power supply. The wireless energy transmission and reception system turns off a switch that electrically connects the power supply unit to the source resonator to induce the source resonator to self-resonate. A target resonator with the same resonant frequency as the source resonator may be disposed within a distance close enough to resonate with the source resonator. Accordingly, a mutual resonance phenomenon may occur between the source resonator and the target resonator, enabling the source resonator to wirelessly supply power to the target resonator, and thereby wirelessly charging the target resonator.

In the examples herein, the source resonator is a resonator that receives energy from a power source, such as an external power supply, and the target resonator is a resonator that wirelessly receives energy from the source resonator due to the mutual resonance phenomenon. The target resonator may be or may be included in a terminal, for example, a mobile phone, a computer, a radio-frequency identification (RFID), a near field communication (NFC) device, a sensor, an appliance, and/or other devices known to one of ordinary skill in the art. The source resonator supplies power to the target resonator so that a device including the target resonator may charge a battery and/or other devices known to one of ordinary skill in the art, without plugging in to a power source using an external cable.

FIG. 1 illustrates an example of an equivalent circuit of a wireless energy transmission and reception system. Referring to FIG. 1, the wireless energy transmission and reception system includes a source-target structure including a source device and a target device. The wireless energy transmission and reception system includes a wireless energy transmitting apparatus corresponding to the source device, and a wireless energy receiving apparatus corresponding to the target device. Since wireless energy is calculated by integrating wireless power for a predetermined period of time, transmitting and receiving the wireless energy refers to transmitting and receiving the wireless power.

In more detail, the wireless energy transmitting apparatus includes a power input unit 110, a power transmitting unit 120, a switch unit 130, and a capacitor $C_1$. The power input unit 110 is physically-separated from the power transmitting unit 120 by the switch unit 130 and the capacitor $C_1$. The wireless energy receiving apparatus includes a receiving unit 140, a power output unit 150, a switch unit 160, and a capacitor $C_2$. The receiving unit 140 is physically-separated from the power output unit 150 by the switch unit 160 and the capacitor $C_2$.

The power input unit 110 stores energy in the capacitor $C_1$, using a power supply unit generating an input voltage $V_{DC}$. The switch unit 130 connects the capacitor $C_1$ to the power input unit 110, while the energy is transmitted from the power supply unit and stored in the capacitor $C_1$. To discharge the stored energy, the switch unit 130 disconnects the capacitor $C_1$ from the power input unit 110, and connects the capacitor $C_1$ to the power transmitting unit 120. The switch unit 130 prevents the capacitor $C_1$ from being connected to the power input unit 110 and the power transmitting unit 120 at the same time.

The power transmitting unit 120 transfers electromagnetic energy to the receiving unit 140, through mutual resonance. In more detail, the power transmitting unit 120 transfers the electromagnetic energy through the mutual resonance between a transmission coil $L_1$ of the power transmitting unit 120 and a reception coil $L_2$ of the receiving unit 140. The level of the mutual resonance between the transmission coil $L_1$ and the reception coil $L_2$ is affected by mutual inductance M between the transmission coil $L_1$ and the reception coil $L_2$.

For example, the power transmitting unit 120 may quantize the electromagnetic energy stored in the capacitor $C_1$, and may transmit the quantized energy to the receiving unit 140 for a symbol unit. The power transmitting unit 120 may control different amounts of the electromagnetic energy to be transmitted to the receiving unit 140 for each symbol unit, and may also transmit information to the receiving unit 140. The symbol unit may be used to transfer the information in a single bit between the source device and the target device. The symbol unit refers to a period or cycle during which the charged capacitor $C_1$ is discharged through the mutual resonance between a source resonator (e.g., the power transmitting unit 120) and a target resonator (e.g., the receiving unit 140), based on an operation of the switch unit 130.

The power input unit 110 includes the power supply unit generating the input voltage $V_{DC}$, an internal resistor $R_{in}$, and the capacitor $C_1$, and the power transmitting unit 120 includes a resistor $R_1$, the transmission coil $L_1$, and the capacitor $C_1$ that form the source resonator. Additionally, the switch unit 130 includes at least one switch. For example, the switch may include an active element enabling an on/off function. In FIG. 1, $R_1$, $L_1$, and $C_1$ represent a resistance, an inductance, and a capacitance, respectively, of the source resonator. A voltage applied to the capacitor $C_1$ among the input voltage $V_{DC}$ is represented by $V_{in}$.

In FIG. 1, the receiving unit 140 receives the electromagnetic energy from the power transmitting unit 120, and stores the received electromagnetic energy in the capacitor $C_2$. The switch unit 160 connects the capacitor $C_2$ to the receiving unit 140, while the electromagnetic energy is transmitted from the power transmitting unit 120 and stored in the capacitor $C_2$. To discharge the stored energy, the switch unit 160 disconnects the capacitor $C_2$ from the receiving unit 140, and connects the capacitor $C_2$ to the power output unit 150. The power output unit 150 transfers the energy stored in the capacitor $C_2$ to a load, for example, a battery. The switch unit 160 prevents the capacitor $C_2$ from being connected to the receiving unit 140 and the power output unit 150 at the same time.

In more detail, the receiving unit 140 receives the electromagnetic energy through the mutual resonance between the reception coil $L_2$ of the receiving unit 140 and the transmission coil $L_1$ of the power transmitting unit 120. The receiving unit 140 charges the capacitor $C_2$ connected to the reception coil $L_2$, with the received electromagnetic energy. The power output unit 150 transfers the energy used to charge the capacitor $C_2$ to the load, for example, the battery. As another example, the power output unit 150 may transfer the energy to a target device requiring power, instead of to the battery.

For example, the receiving unit 140 may receive the electromagnetic energy from the power transmitting unit 120 for a symbol unit. The receiving unit 140 may further receive the information from the power transmitting unit 120, and may demodulate the information based on an amount of the received electromagnetic energy.

The receiving unit 140 includes a resistor $R_2$, the reception coil $L_2$, and the capacitor $C_2$ that form a target resonator, and the power output unit 150 includes the capacitor $C_2$ and the battery. The switch unit 160 includes at least one switch. In FIG. 1, $R_2$, $L_2$, and $C_2$ represent a resistance, an inductance, and a capacitance, respectively, of the target resonator. A voltage applied to the capacitor $C_2$ among the electromagnetic energy received by the reception coil $L_2$ is represented by $V_{out}$.

The above-described wireless energy transmission and reception system enables power to be wirelessly transmitted when the power input unit 110 is physically separated from the power transmitting unit 120, and the receiving unit 140 is physically separated from the power output unit 150. This wireless energy transmission and reception system is referred to as a Resonator Isolation (RI) system.

The RI system does not need a power amplifier because power may be supplied from a direct current (DC) source (e.g., the power supply unit generating the input voltage $V_{DC}$) directly to the source resonator. Further, the RI system does not require a rectifying operation of a rectifier because energy is captured from energy used to charge the capacitor $C_2$ of the wireless energy receiving apparatus. Further, a transmission efficiency is not sensitive to a change in a distance between the wireless energy transmitting apparatus and the wireless energy receiving apparatus because there is no need to perform impedance matching. Additionally, the RI system may be easily extended from the wireless energy transmission and reception system including a single transmitter and a single receiver to a wireless energy transmission and reception system including a plurality of transmitters and a plurality of receivers.

Figure 2:
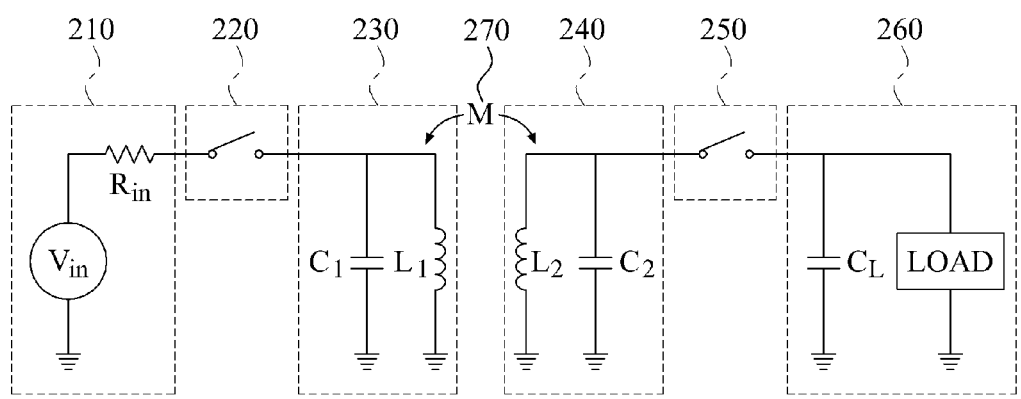
FIG. 2 is a diagram illustrating another example of an equivalent circuit of a wireless energy transmission and reception system.

FIG. 2 illustrates another example of an equivalent circuit of a wireless energy transmission and reception system. Referring to FIG. 2, the wireless energy transmission and reception system includes a source-target structure including a source device and a target device. The wireless energy transmission and reception system includes a wireless energy transmitting apparatus corresponding to the source device, and a wireless energy receiving apparatus corresponding to the target device.

In more detail, the wireless energy transmitting apparatus includes a power charging unit 210, a control unit 220, and a transmitting unit 230. The power charging unit 210 is physically separated from the transmitting unit 230 by the control unit 220. The wireless energy receiving apparatus includes a charging unit 240, a control unit 250, and a power output unit 260. The charging unit 240 is physically separated from the power output unit 260 by the control unit 250.

In this example, the power charging unit 210 includes a power supply unit $V_{in}$ and an internal resistor $R_{in}$. The transmitting unit 230 includes a capacitor $C_1$ and an inductor $L_1$. In FIG. 2, the capacitor $C_1$ and the inductor $L_1$ are referred to as a source resonator. In this example, the source resonator functions as the transmitting unit 230. The transmitting unit 230 transmits energy stored in the source resonator to a target resonator, through mutual resonance M 270 between the source resonator and the target resonator.

The control unit 220 includes a switch, and turns on (e.g., closes) the switch to enable power to be supplied from the power charging unit 210 to the transmitting unit 230. In more detail, a voltage from the power supply unit $V_{in}$ is applied to the capacitor $C_1$, and a current is applied to the inductor $L_1$. For example, when the source resonator reaches a steady state due to the voltage applied from the power supply unit $V_{in}$, the voltage applied to the capacitor $C_1$ may include a value of '0', and the current flowing in the inductor $L_1$ may include a value of '$V_{in}/R_{in}$'. In the steady state, the source resonator may be charged with power, using the current applied to the inductor $L_1$.

When the power used to charge the source resonator in the steady state reaches a predetermined value or a maximum value, the control unit 220 turns off (e.g., opens) the switch. The control unit 220 may set information on the predetermined value. By turning off the switch, the control unit 220 separates the power charging unit 210 from the transmitting unit 230. When the power charging unit 210 is separated from the transmitting unit 230, the source resonator starts self-resonating between the capacitor $C_1$ and the inductor $L_1$. Energy stored in the source resonator is transferred to the target resonator, through the mutual resonance M 270 between the source resonator and the target resonator. A resonant frequency $f_1$ of the source resonator may be the same as a resonant frequency $f_2$ of the target resonator. Additionally, a value of the resonant frequency $f_1$, and a value of resonant frequency $f_2$, may be determined based on the following equations.

$$f_2 = \frac{1}{2\pi\sqrt{L_1 C_1}}, f_2 = \frac{1}{2\pi\sqrt{L_2 C_2}} \qquad (1)$$

In Equations (1), $L_1$ denotes an inductance of the inductor $L_1$, $C_1$ denotes a capacitance of the capacitor $C_1$, $L_2$ denotes an inductance of an inductor $L_2$ of the target resonator, and $C_2$ denotes a capacitance of a capacitor $C_2$ of the target resonator.

The transmitting unit 230 may quantize the energy stored in the source resonator, and may transmit the quantized energy to the target resonator for a symbol unit. For example, the transmitting unit 230 may control different amounts of the energy to be transmitted to the target resonator for each symbol unit, and may also transmit information to the target resonator. The symbol unit may be used to transfer the information in a single bit between the source device and the target device. The symbol unit refers to a period or cycle during which the charged capacitor $C_1$ and the inductor $L_1$ are discharged through the mutual resonance M 270 between the source resonator and target resonator, based on an operation of the control unit 220.

In this example, the charging unit 240 includes the capacitor $C_2$ and the inductor $L_2$. In FIG. 2, the capacitor $C_2$ and the inductor $L_2$ are referred to as the target resonator. In this example, the target resonator functions as the charging unit 240. The charging unit 240 receives the energy stored in the source resonator via the target resonator, through the mutual resonance M 270 between the source resonator and the target resonator. The power output unit 260 includes a load and a capacitor $C_L$.

The control unit 250 includes a switch, and turns off (e.g., opens) the switch. By turning off the switch, the control unit 250 separates the charging unit 240 from the power output unit 260. During the mutual resonance M 270 between the source resonator and the target resonator, the source resonator is separated from the power supply unit $V_{in}$ by the control unit 220 including the switch being open, and the target resonator is separated from the load and the capacitor $C_L$ by the control unit 250 including the switch being open. The energy stored in the source resonator is transferred to the target resonator, through the mutual resonance M 270. In more detail, the energy stored in the source resonator charges the capacitor $C_2$ and the inductor $L_2$ of the charging unit 240, through the mutual resonance M 270. The resonant frequency $f_1$ of the source resonator may be the same as the resonant frequency $f_2$ of the target resonator.

When the energy used to charge the target resonator reaches a predetermined value or a maximum value, the control unit 250 turns on (e.g., closes) the switch. The control unit 250 may set information on the predetermined value. By turning on the switch, the control unit 250 connects the capacitor $C_L$ to the charging unit 240, and the resonant frequency of the target resonator is changed. A value of the changed resonant frequency $f_2$ of the target resonator may be determined based on the following equation.

$$f_2' = \frac{1}{2\pi\sqrt{L_2(C_2 + C_L)}} \quad (2)$$

In Equation (2), $C_L$ denotes a capacitance of the capacitor $C_L$.

Accordingly, the mutual resonance M 270 between the source resonator and the target resonator is terminated. For example, when the changed resonant frequency $f_2$ is much smaller than the resonant frequency $f_2$ based on a Q-factor of the target resonator, the mutual resonance M 270 is removed. Additionally, the charging unit 240 transfers power used to charge the capacitor $C_2$ and the inductor $L_2$ to the power output unit 260, which transfers the power to a load.

When the energy used to charge the target resonator is less than a predetermined value, the control unit 250 turns off the switch. The charging unit 240 may recharge the target resonator with energy using the mutual resonance M 270 between the source resonator and the target resonator.

For example, the charging unit 240 may receive the energy from the transmitting unit 230 for a symbol unit. The charging unit 240 may also receive the information from the transmitting unit 230, and may demodulate the information based on an amount of the received energy.

During the mutual resonance M 270 between the source resonator and the target resonator, the switch of the control unit 250 is not connected between the charging unit 240 and the power output unit 260. Accordingly, it is possible to prevent transmission efficiency from being reduced due to a connection to the switch.

A scheme of controlling a point in time of capturing energy stored in a target resonator of FIG. 2 may be performed more easily than a scheme of transferring energy stored in a capacitor of FIG. 1. In the scheme of transferring the energy stored in a capacitor, only the energy in the capacitor is captured. However, in a scheme of changing a resonant frequency of the target resonator and capturing the energy stored in the target resonator, the energy stored in an inductor and a capacitor of the target resonator is captured. Accordingly, a degree of freedom for the point in time of capturing the energy may be improved.

To receive supplied power, target devices located in a wide area may be required to approach a source device, or the source device may be required to approach each of the target devices. However, when a point in time at which the source device and the target devices approach each other is not known, both the source device and the target devices may not easily predict a point in time at which power supply is required. Hereinafter, description will be given on an example of a target device and a source device of an RI system verifying a point in time at which power is supplied and charging is performed, and operating at the verified point in time.

Figure 3:
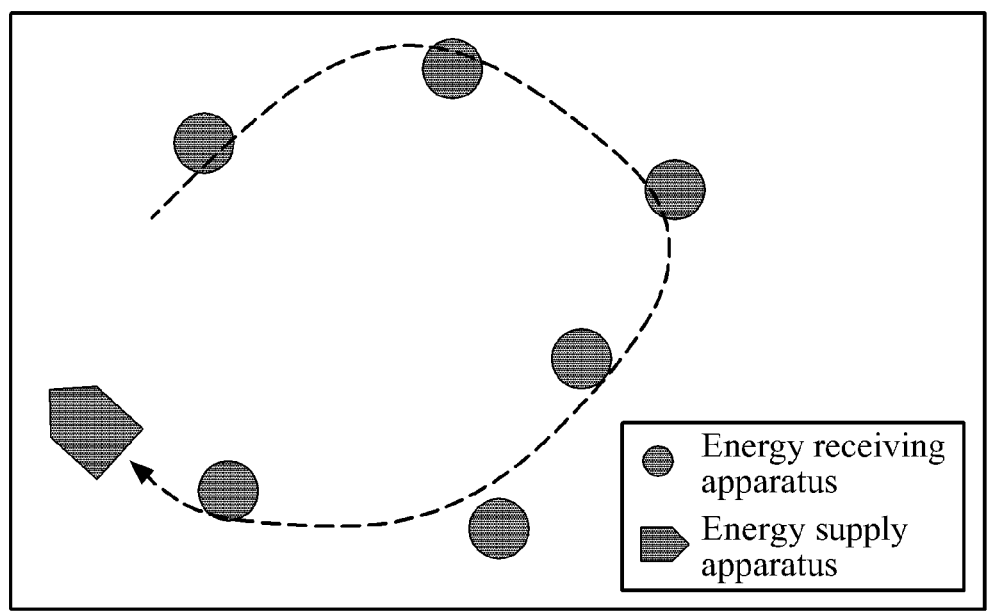
FIG. 3 is a diagram illustrating an example of an energy supply apparatus moving along a route in which energy receiving apparatuses are fixed.

FIG. 3 illustrates an example of an energy supply apparatus moving along a route in which energy receiving apparatuses are fixed. For example, when the energy receiving apparatuses are disposed in fixed locations, the energy supply apparatus may effectively supply energy to all of the energy receiving apparatuses, while moving along the route in which the energy receiving apparatuses are located. In this example, the energy supply apparatus may use a Hamiltonian tracking scheme and/or other schemes known to one of ordinary skill in the art.

Figure 4:
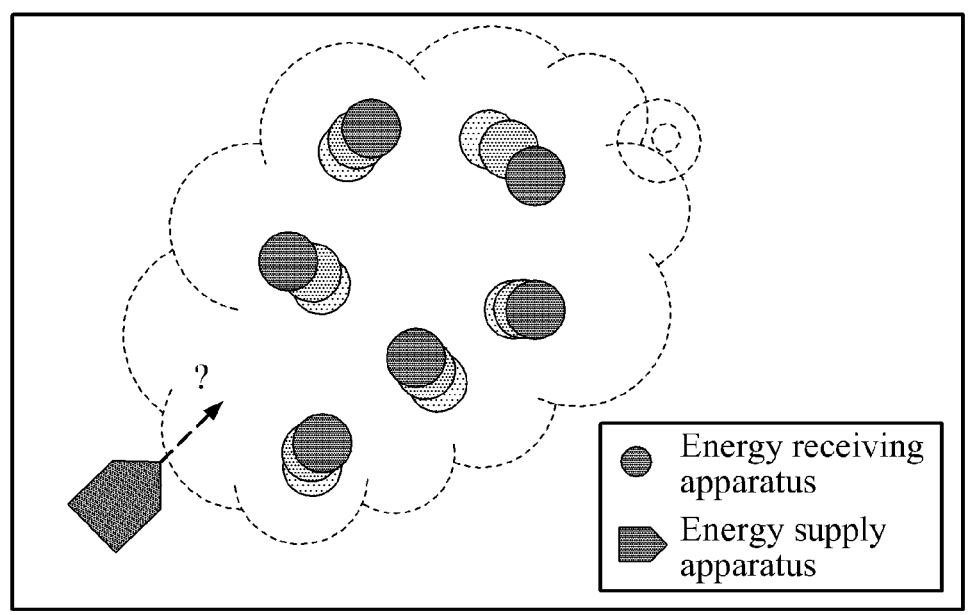
FIG. 4 is a diagram illustrating an example of energy receiving apparatuses that are not disposed in fixed locations, and an energy supply apparatus moving regardless of locations of the energy receiving apparatuses.

FIG. 4 illustrates an example of energy receiving apparatuses that are not disposed in fixed locations, and an energy supply apparatus moving regardless of locations of the energy receiving apparatuses. For example, when the energy receiving apparatuses move, rather than being fixed, or when the energy supply apparatus does not move along fixed locations of the energy receiving apparatuses, the energy supply apparatus may randomly come into contact with the energy receiving apparatuses. When the energy supply apparatus randomly comes into contact with the energy receiving apparatuses, it may be difficult to schedule energy charging of the energy receiving apparatuses.

Figure 5:
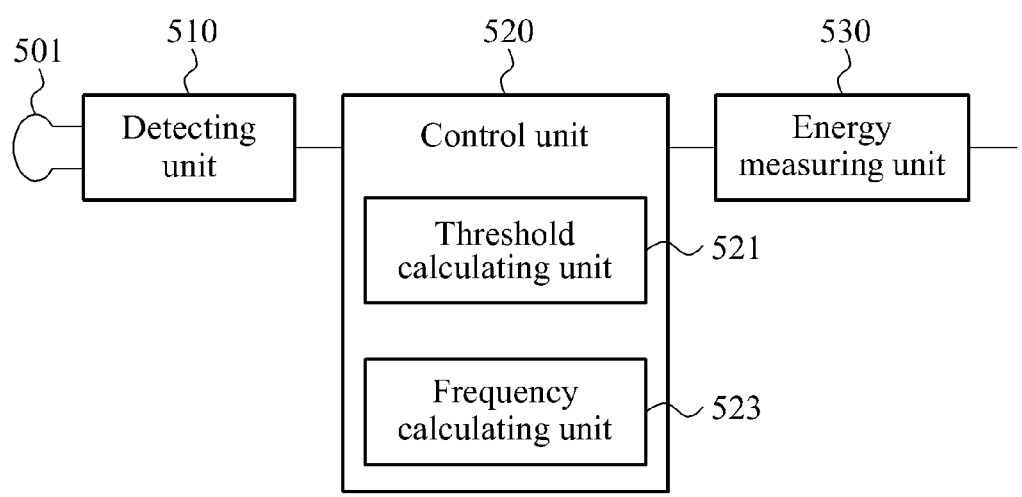
FIG. 5 is a block diagram illustrating an example of a wireless energy receiving apparatus.

FIG. 5 illustrates an example of a wireless energy receiving apparatus. Referring to FIG. 5, the wireless energy receiving apparatus includes a target resonator 501, a detecting unit 510, a control unit 520, and an energy measuring unit 530. Hereinafter, a terminal refers to electronic equipment including the wireless energy receiving apparatus.

The detecting unit 510 detects a presence of an energy supply apparatus based on a change in a waveform of energy stored in the terminal, namely, the target resonator 501. The energy supply apparatus supplies energy to the terminal. For example, when a source resonator of the energy supply apparatus is located at a distance enabling mutual resonance with the target resonator 501, the mutual resonance occurs between the target resonator 501 and the source resonator.

Figure 9:
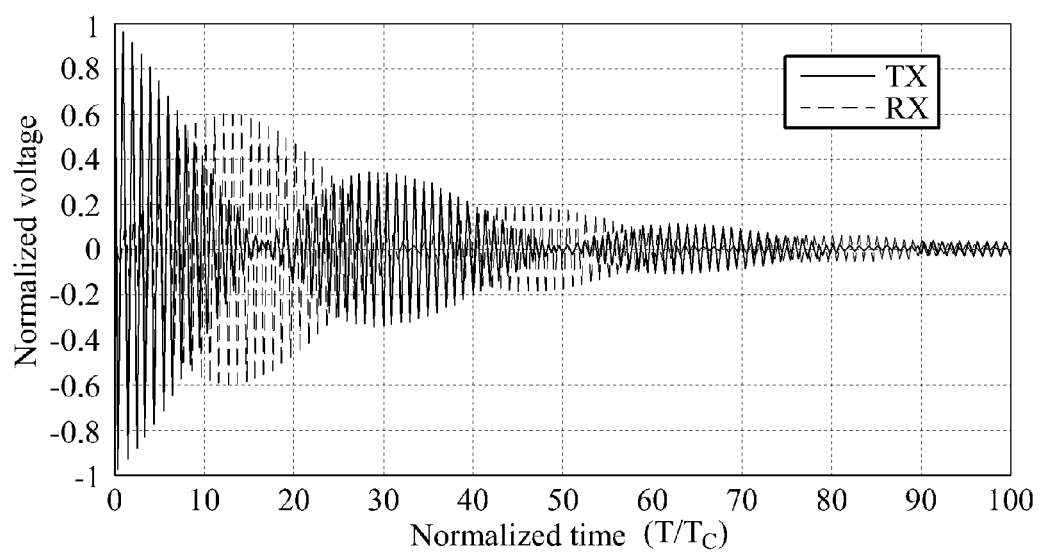
FIG. 9 is a graph illustrating an example of a change in voltage applied to a source resonator, and a change in voltage applied to a target resonator, when an energy receiving apparatus exists around a wireless energy transmitting apparatus.

When the mutual resonance occurs, the waveform of the energy stored in the target resonator 501 is changed, as illustrated in FIG. 9. The source resonator is mounted in the energy supply apparatus, and the target resonator 501 is mounted in the terminal.

The energy measuring unit 530 measures an amount of energy stored in the terminal, namely, the target resonator 501. The energy measuring unit 530 may measure, in real time, the amount of the energy stored in the terminal.

When the amount of the energy measured by the energy measuring unit 530 is less than or equal to a predetermined threshold, the control unit 520 changes a state of the target resonator 501 from a non-resonant state to a resonant state to charge the target resonator 501 with energy. In more detail, the control unit 520 includes a threshold calculating unit 521 and a frequency calculating unit 523.

The threshold calculating unit 521 may calculate a predetermined threshold based on a frequency that the terminal comes into contact with the energy supply apparatus detected by the detecting unit 510 for a predetermined period of time, and a ratio of an operation time (e.g., active time) of the terminal to a charging time required to charge the terminal with energy supplied from the energy supply apparatus. The frequency may be a frequency that the terminal detects the energy supply apparatus. An operation of the terminal may include any operation of the terminal that is known to one of ordinary skill in the art, except for charging and idling of the terminal.

In another example, the threshold calculating unit 521 may calculate the predetermined threshold based on the frequency that the terminal comes into contact with the energy supply apparatus, a charging capacity of the terminal, and an energy consumption rate measured when energy is consumed during an operation of the terminal. In still another example, the predetermined threshold to be a ratio of residual energy stored in the terminal to the charging capacity of the terminal. When the charging capacity is set to 1 W and an amount of the residual energy is set to 0.8 W, the predetermined threshold may be calculated to be '0.8'.

In yet another example, the threshold calculating unit 521 may calculate the predetermined threshold to be an energy value corresponding to a maximum ratio of the operation time of the terminal to a first time period from a time at which charging of the terminal is completed once to a time at which next charging of the terminal is completed. The first time period may include the operation time of the terminal, the charging time required to charge the terminal, and/or a charging waiting time required when the terminal waits for an approach of the energy supply apparatus. The charging time may include a charging preparation time, an actual charging time, and/or a charging finish time. The charging preparation time refers to a time required to synchronize a switch that changes the state of the target resonator 501 with an operation switch of the source resonator. The actual charging time refers to a time at which the terminal is charged by wirelessly receiving energy from the energy supply apparatus, namely, the source resonator. The charging finish time refers to a time required by the energy supply apparatus to verify the non-resonant state of the target resonator 501.

The frequency calculating unit 523 may calculate a number of times charging of the terminal is started by the energy supply apparatus for a predetermined period of time, and may calculate the frequency that the terminal comes into contact with the energy supply apparatus based on the calculated number of times. In another example, the frequency calculating unit 523 may measure a time at which charging of the terminal is started by the energy supply apparatus, and may calculate an average value of the frequency that the terminal comes into contact with the energy supply apparatus based on the measured time. To determine whether the charging of the terminal is started, the frequency calculating unit 523 determines whether the mutual resonance occurs between the target resonator 501 and the source resonator based on the change in the waveform of the energy stored in the target resonator 501.

When the terminal is completely charged with energy, the control unit 520 additionally connects an impedance to the target resonator 501 to change the state of the target resonator 501 from the resonant state to the non-resonant state. That is, when a resonant frequency of the target resonator 501 is changed, the mutual resonance between the target resonator 501 and the source resonator is terminated, because the resonant frequency of the target resonator 501 is not matched to a resonant frequency of the source resonator. Accordingly, the state of the target resonator 501 is changed from the resonant state to the non-resonant state. Since the resonant frequency of the target resonator 501 is determined based on an impedance of the target resonator 501, the control unit 520 controls a switch connected to the impedance to be powered on (e.g., to connect to the target resonator 501), to change the resonant frequency of the target resonator 501.

When the residual energy stored in the terminal is greater than a predetermined threshold, the control unit 520 maintains the non-resonant state of the target resonator 501. When the residual energy is less than or equal to the predetermined threshold, the control unit 520 changes the state of the target resonator 501 from the non-resonant state to the resonant state so that the mutual resonance may occur between the target resonator 501 and the source resonator. In this example, when the control unit 520 maintains the resonant state of the target resonator 501, and the energy supply apparatus approaches the wireless energy receiving apparatus within the distance enabling the mutual resonance, the terminal quickly enters a charging mode.

The control unit 520 may control an overall operation of the wireless energy receiving apparatus of FIG. 5, and may perform functions of the detecting unit 510 and/or the energy measuring unit 530. The detecting unit 510, the control unit 520, and the energy measuring unit 530 are separately illustrated in FIG. 5 to separately describe each function. Thus, in implementing a product, the control unit 520 may perform all of the functions, or may perform a portion of the functions.

Figure 6:
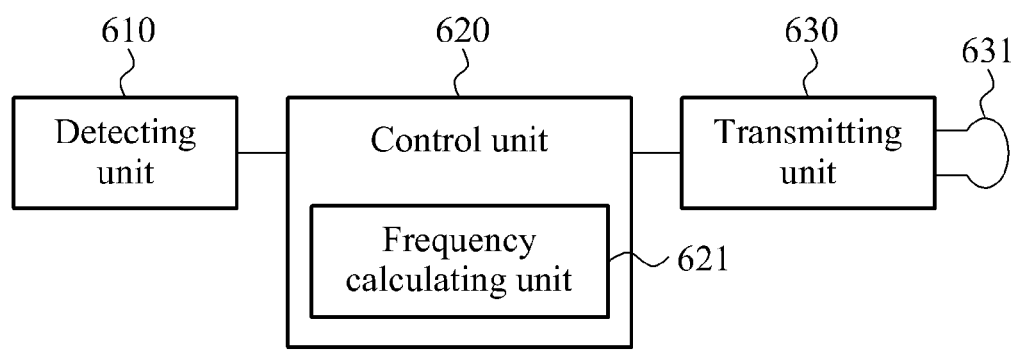
FIG. 6 is a block diagram illustrating an example of a wireless energy transmitting apparatus.

FIG. 6 illustrates an example of a wireless energy transmitting apparatus. Referring to FIG. 6, the wireless energy transmitting apparatus includes a detecting unit 610, a control unit 620, a transmitting unit 630, and a source resonator 631. Hereinafter, a terminal refers to electronic equipment including the wireless energy transmitting apparatus.

The detecting unit 610 detects a presence of an energy receiving apparatus based on a change in a waveform of energy stored in the terminal, namely, the source resonator 631. The energy receiving apparatus receives energy from the terminal.

The control unit 620 calculates a predetermined threshold based on a frequency that the terminal comes into contact with the energy receiving apparatus detected by the detecting unit 610 for a predetermined period of time, a charging capacity of the energy receiving apparatus, and an energy consumption rate measured when energy is consumed during an operation of the energy receiving apparatus. The predetermined threshold may be used as a criterion to change a state of a target resonator of the energy receiving apparatus from a non-resonant state to a resonant state. Information on the charging capacity and the energy consumption rate may be stored in advance in the control unit 620, and/or may be received from the energy receiving apparatus.

The control unit 620 includes a frequency calculating unit 621. The frequency calculating unit 621 calculates a number of times charging of the energy receiving apparatus is started by the terminal for a predetermined period of time, and calculates the frequency that the terminal comes into contact with the energy receiving apparatus based on the calculated number of times. To determine whether the charging of the energy receiving apparatus is started, the frequency calculating unit 621 determines whether mutual resonance occurs between the source resonator 631 and the target resonator of the energy receiving apparatus based on the change in the waveform of the energy stored in the source resonator 631.

The transmitting unit 630 transmits the calculated predetermined threshold to the energy receiving apparatus, through the mutual resonance between the source resonator 631 and the target resonator.

Figure 7:
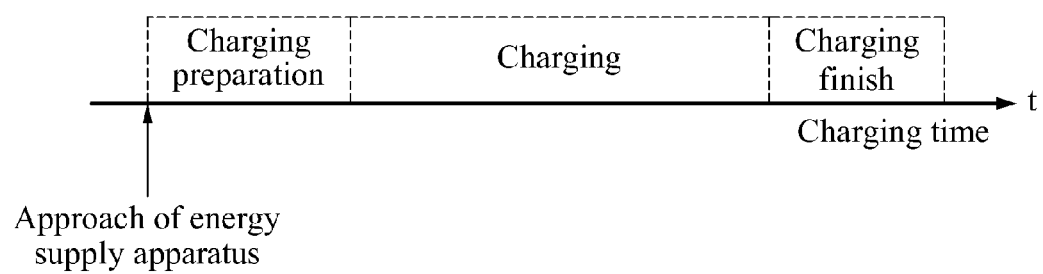
FIG. 7 is a diagram illustrating an example of a charging time in a wireless energy receiving apparatus.

The control unit 620 may control an overall operation of the wireless energy transmitting apparatus of FIG. 6, and may perform functions of the detecting unit 610 and/or the transmitting unit 630. The detecting unit 610, the control unit 620, and the transmitting unit 630 are separately illustrated in FIG. 6 to separately describe each function. Thus, in implementing a product, the control unit 620 may perform all of the functions, or may perform a portion of the functions FIG. 7 illustrates an example of a charging time in a wireless energy receiving apparatus. Referring to FIG. 7, the charging time includes a charging preparation time, an actual charging time, and a charging finish time, as described above with respect to FIG. 5. For example, when an energy supply apparatus approaches the wireless energy receiving apparatus including a target resonator in a resonant state, the energy supply apparatus starts to charge the wireless energy receiving apparatus. In an RI system, the wireless energy receiving apparatus may require the charging preparation time to be the same as a synchronization margin that is a time required to synchronize operations of switches included in the target resonator and a source resonator of the energy supply apparatus and the wireless energy receiving apparatus, respectively. When the charging of the wireless energy receiving apparatus is completed, the wireless energy receiving apparatus changes a state of the target resonator from the resonant state to a non-resonant state. During the charging finish time, the energy supply apparatus may be made aware of the non-resonant state of the wireless energy receiving apparatus.

Figure 8:
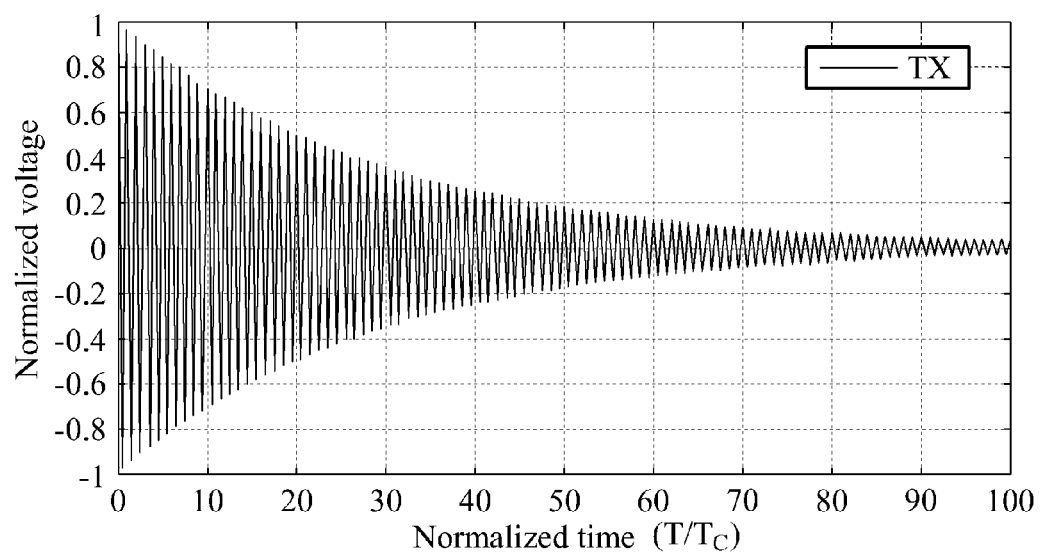
FIG. 8 is a graph illustrating an example of a change in voltage applied to a source resonator when an energy receiving apparatus does not exist around a wireless energy transmitting apparatus.

FIG. 8 illustrates an example of a change in voltage applied to a source resonator when an energy receiving apparatus does not exist around a wireless energy transmitting apparatus. For example, when the energy receiving apparatus is not disposed within a distance enabling the wireless energy transmitting apparatus to wirelessly transmit energy to the energy receiving apparatus, an amount of energy (TX) stored in the source resonator of the wireless energy transmitting apparatus is naturally reduced. Referring to FIG. 8, the amount of the energy stored in the source resonator corresponds to the change in the voltage applied to the source resonator.

FIG. 9 illustrates an example of a change in voltage applied to a source resonator, and a change in voltage applied to a target resonator, when an energy receiving apparatus exists around a wireless energy transmitting apparatus. For example, when the energy receiving apparatus is disposed within a distance enabling the wireless energy transmitting apparatus to wirelessly transmit energy to the energy receiving apparatus, an amount of energy (TX) stored in the source resonator of the wireless energy transmitting apparatus, and an amount of energy (RX) stored in a target resonator of the energy receiving apparatus, are periodically changed. This is because energy is exchanged between the wireless energy transmitting apparatus and the energy receiving apparatus through mutual resonance between the source resonator and the target resonator, respectively. Referring to FIG. 9, the amount of the energy stored in the source resonator corresponds to the change in the voltage applied to the source resonator, and the amount of the energy stored in the target resonator corresponds to the change in the voltage applied to the target resonator.

For example, when the energy receiving apparatus is charged with the energy supplied from the wireless energy transmitting apparatus, the energy stored in the source resonator is decreased, and the energy stored in the target resonator is increased, as illustrated in FIG. 9. When the charging of the energy receiving apparatus is completed, the target resonator of the energy receiving apparatus operates in the non-resonant state, and a waveform of the voltage applied to the source resonator of the wireless energy transmitting apparatus is changed, as illustrated in FIG. 8. The wireless energy transmitting apparatus interprets the waveform of the voltage applied to the source resonator, to determine whether the energy receiving apparatus enabling the mutual resonance approaches, whether the charging of the energy receiving apparatus is started, and whether the charging is completed.

Figure 10A:
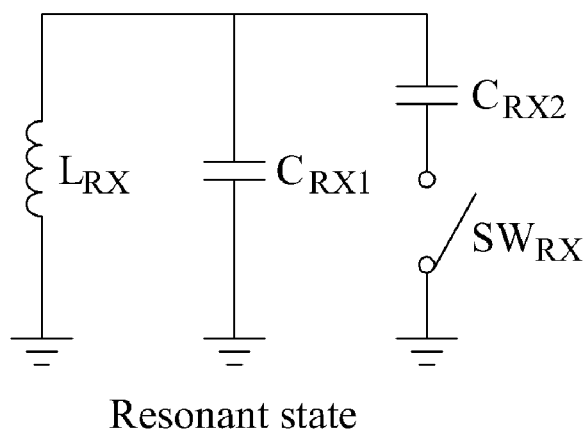
FIGS. 10A and 10B are diagrams illustrating an example of an equivalent circuit of a resonant state of a wireless energy receiving apparatus, and an example of an equivalent circuit of a non-resonant state of the wireless energy receiving apparatus, respectively.
Figure 10B:
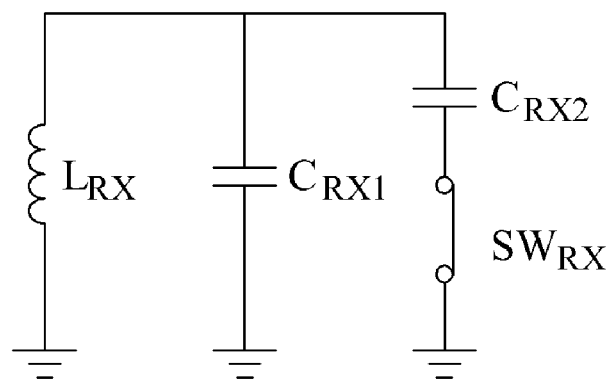

FIGS. 10A and 10B illustrate an example of an equivalent circuit of a resonant state of a wireless energy receiving apparatus, and an example of an equivalent circuit of a non-resonant state of the wireless energy receiving apparatus, respectively. In the resonant state, a resonant frequency of a target resonator of the wireless energy receiving apparatus is determined based on an inductor L and a capacitor $C_{RX1}$. In the non-resonant state, a capacitor $C_{RX2}$ is added through a switch $SW_{RX}$, and accordingly, the resonant frequency is changed. As such, the resonant frequency of the target resonator does not match a resonant frequency of a source resonator of an energy supply apparatus, and thus, mutual resonance between the target resonator and the source resonator is terminated.

Figure 11:
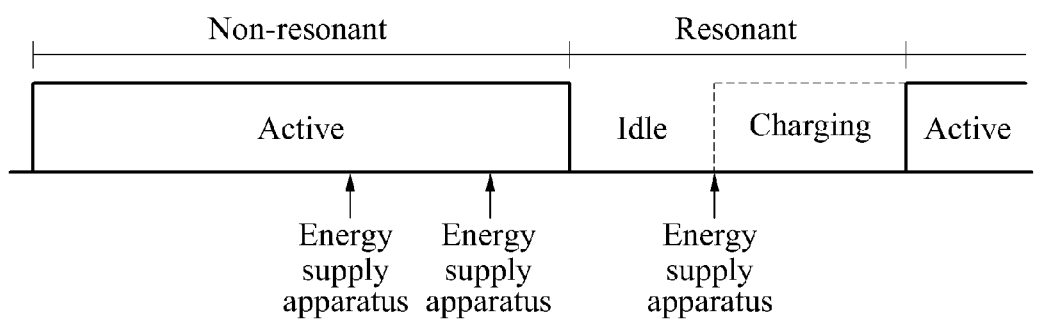
FIG. 11 is a diagram illustrating an example of a state of a wireless energy receiving apparatus, and an operation of charging the wireless energy receiving apparatus, based on time.

FIG. 11 illustrates an example of a state of a wireless energy receiving apparatus, and an operation of charging the wireless energy receiving apparatus, based on time. In this example, the wireless energy receiving apparatus is passively-charged.

When energy other than only minimum energy required by an energy supply apparatus to charge the wireless energy receiving apparatus is remaining in the wireless energy receiving apparatus, the wireless energy receiving apparatus maintains a non-resonant state of a target resonator of the wireless energy receiving apparatus. The wireless energy receiving apparatus is charged with energy supplied from the energy supply apparatus, only when the energy other than the minimum energy does not exist. Accordingly, the wireless energy receiving apparatus performs an operation without interruption until all of the energy other than the minimum energy is consumed. Referring to FIG. 11, a time at which the wireless energy receiving apparatus performs an operation is represented by an 'active' state. In the active state, the target resonator operates in the non-resonant state, and accordingly, mutual resonance between the target resonator and a source resonator of the energy supply apparatus does not occur despite approaches of the energy supply apparatus.

When all of the energy other than the minimum energy is consumed, the wireless energy receiving apparatus changes the non-resonant state of the target resonator to a resonant state, and changes to an idle state while waiting for an approach of the energy supply apparatus. In this example, when the energy supply apparatus approaches the wireless energy receiving apparatus in the idle state, the mutual resonance between the target resonator and the source resonator occurs, and charging of the wireless energy receiving apparatus is started. When the charging is completed, the wireless energy receiving apparatus changes the resonant state of the target resonator back to the non-resonant state, and returns to the active state.

Figure 12:
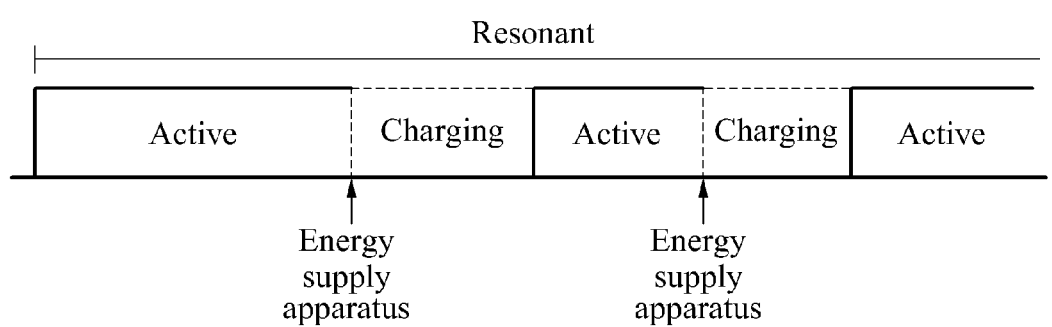
FIG. 12 is a diagram illustrating another example of a state of a wireless energy receiving apparatus, and an operation of charging the wireless energy receiving apparatus, based on time.

FIG. 12 illustrates another example of a state of a wireless energy receiving apparatus, and an operation of charging the wireless energy receiving apparatus, based on time. In this example, the wireless energy receiving apparatus is actively-charged. The wireless energy receiving apparatus maintains a resonant state of a target resonator of the wireless energy receiving apparatus, despite energy received from an energy supply apparatus remaining in the wireless energy receiving apparatus.

When the energy supply apparatus approaches the wireless energy receiving apparatus while the wireless energy receiving apparatus performs an operation in an active state, mutual resonance between the target resonator and a source resonator of the energy supply apparatus occurs, and charging of the wireless energy receiving apparatus is started. During the charging, the wireless energy receiving apparatus does not perform the operation.

In another example in which the energy supply apparatus approaches the wireless energy receiving apparatus while all energy in the wireless energy receiving apparatus is consumed, the wireless energy receiving apparatus maintains an idle state until charging of the wireless energy receiving apparatus is started. That is, when the energy supply apparatus approaches the wireless energy receiving apparatus in the idle state, the charging is started. When the charging is completed, the wireless energy receiving apparatus returns to the active state, and may perform the operation again.

Figure 13:
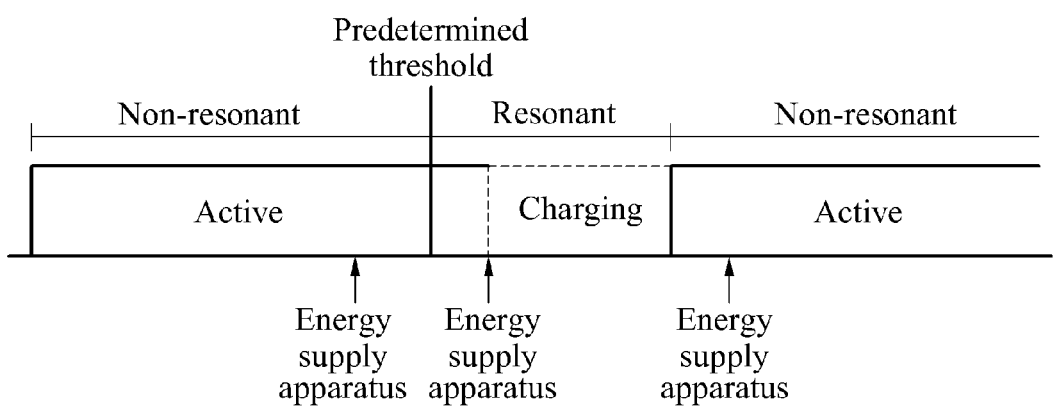
FIG. 13 is a diagram illustrating still another example of a state of a wireless energy receiving apparatus, and an operation of charging the wireless energy receiving apparatus, based on time.

FIG. 13 illustrates still another example of a state of a wireless energy receiving apparatus, and an operation of charging the wireless energy receiving apparatus, based on time. In this example, the wireless energy receiving apparatus is restrictively-charged.

When an amount of residual energy in the wireless receiving apparatus is less than or equal to a predetermined threshold, the wireless energy receiving apparatus maintains a resonant state of a target resonator of the wireless energy receiving apparatus. When the amount of the residual energy is greater than the predetermined threshold, the wireless energy receiving apparatus maintains a non-resonant state of the target resonator, and an active state to perform an operation. In the active state, mutual resonance between the target resonator and a source resonator of the energy supply apparatus does not occur despite approaches of the energy supply apparatus.

For example, when the amount of the residual energy is less than or equal to a predetermined threshold, the wireless energy receiving apparatus adjusts a resonant frequency of the target resonator to match a resonant frequency of the source resonator. That is, the resonant frequency of the target resonator is adjusted so that mutual resonance between the target resonator and the source resonator occurs. Additionally, when the energy supply apparatus approaches the wireless energy receiving apparatus within a distance enabling the mutual resonance, charging of the wireless energy receiving apparatus is started through the mutual resonance. When the charging is completed, the wireless energy receiving apparatus changes the resonant state of the target resonator back to the non-resonant state, and may perform an operation in the active state.

To efficiently charge the wireless energy receiving apparatus, a ratio of time used by the wireless energy receiving apparatus to perform an operation may be required to be maximized based on the predetermined threshold. For example, when an extremely high predetermined threshold is set, a charging time required to charge the wireless energy receiving apparatus with energy may be lengthened. In another example, when an extremely low predetermined threshold is set, an idle time in which the wireless energy receiving apparatus is in the idle state without performing an operation may be lengthened.

An optimum value $\overline{\epsilon_{thr}}$ of a predetermined threshold $\epsilon_{thr}$ that corresponds to a maximum ratio of an active time to a frequency $\lambda$ that the wireless energy receiving apparatus comes into contact with the energy supply apparatus, may be determined based on the following equation.

$$\overline{\epsilon_{thr}} = \underset{\epsilon}{\mathrm{argmax}} \frac{E[\text{Active time}|\lambda, \epsilon_{thr} = \epsilon]}{E[\text{Active time} + \text{Charging time} + \text{Idle time}|\lambda, \epsilon_{thr} = \epsilon]} \quad (3)$$

In Equation (3), the optimum value $\overline{\epsilon_{thr}}$ is changed based on a value of the frequency $\lambda$. Additionally, the active time, the charging time, and the idle time may be calculated based on the frequency $\lambda$, a charging capacity of the wireless energy receiving apparatus, and/or an energy consumption rate measured when energy is consumed during an operation of the wireless energy receiving apparatus.

A wireless energy transmitting apparatus may provide the wireless energy receiving apparatus with the optimum value $\overline{\epsilon_{thr}}$. Information on the optimum value may be provided through data transmission of an RI system.

Figure 14:
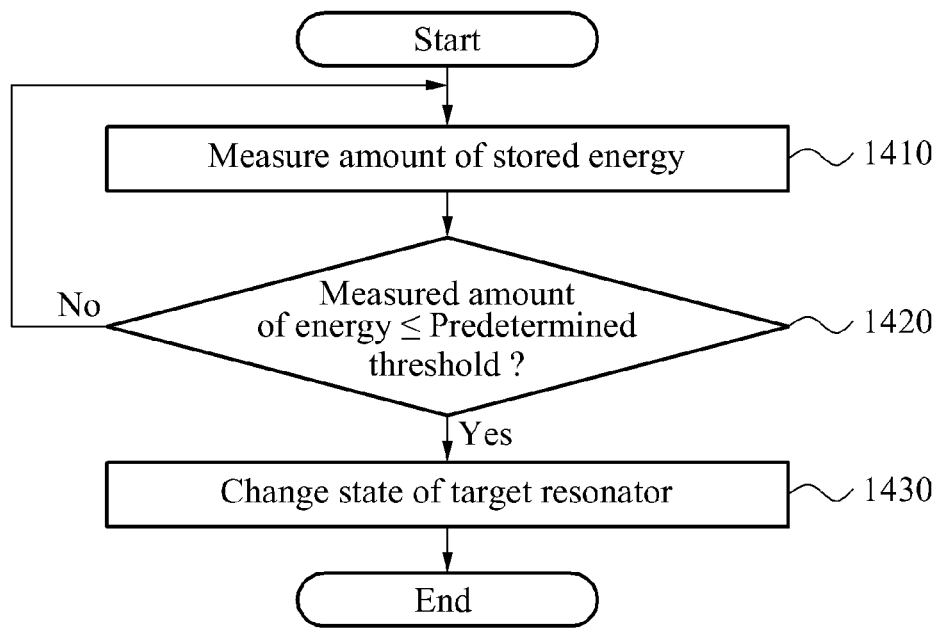
FIG. 14 is a flowchart illustrating an example of a wireless energy receiving method.

FIG. 14 illustrates an example of a wireless energy receiving method. Referring to FIG. 14, in operation 1410, an energy receiving apparatus measures an amount of energy stored in the energy receiving apparatus, namely, a target resonator of the energy receiving apparatus.

In operation 1420, the energy receiving apparatus determines whether the measured amount of the energy is less than or equal to a predetermined threshold. The energy receiving apparatus may calculate the predetermined threshold based on a frequency that the energy receiving apparatus comes into contact with an energy supply apparatus, and a ratio of an operation time of the energy receiving apparatus to a charging time required to charge the energy receiving apparatus with energy supplied from the energy supply apparatus. The energy receiving apparatus may calculate a number of times charging is started by the energy supply apparatus for a predetermined period of time, and may calculate the frequency that the energy receiving apparatus comes into contact with the energy supply apparatus based on the calculated number of times. If the measured amount of the energy is less than or equal to the predetermined threshold, the method continues in operation 1430. Otherwise, the method returns to operation 1410.

In operation 1430, the energy receiving apparatus changes a state of the target resonator from a non-resonant state to a resonant state. Accordingly, a mutual resonance between the target resonator and a source resonator of the energy supply apparatus may occur to charge the target resonator with energy.

For example, the wireless energy receiving method may be applied in power charging of a sensor in a wireless sensor network (WSN). In a mobile environment, when an energy supply apparatus randomly supplies energy to an energy receiving apparatus, the wireless energy receiving method may also be effectively applied.

By using the frequency that the energy receiving apparatus comes into contact with the energy supply apparatus, an amount of energy consumed when the energy receiving apparatus is charged with energy may be minimized, even when energy receiving apparatuses move rather than being fixed, or even when the energy supply apparatus randomly moves. Additionally, by minimizing a time at which an operation of the energy receiving apparatus is interrupted due to lack of energy and an energy charging, an active time of the energy receiving apparatus may be maximized.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless energy receiving apparatus in a terminal configured to wirelessly receive energy through mutual resonance between a resonator of an energy supply apparatus configured to supply the energy and a resonator of the terminal, the wireless energy receiving apparatus comprising:
   an energy measuring unit configured to measure an amount of energy stored in the terminal; and
   a control unit configured to change a state of the resonator of the terminal from a non- resonant state to a resonant state by comparing the measured amount of energy with a predetermined threshold,
   wherein the predetermined threshold is determined based on a frequency that the terminal comes into contact with the energy supply apparatus.

2. The wireless energy receiving apparatus of claim 1, wherein the energy measuring unit is further configured to:
   measure, in real time, the amount of energy stored in the terminal.

3. The wireless energy receiving apparatus of claim 1, wherein the control unit comprises:
   a threshold calculating unit configured to calculate the predetermined threshold based on the frequency that the terminal comes into contact with the energy supply apparatus, and a ratio of the operation time of the terminal to a charging time required to charge the terminal with the energy supplied from the energy supply apparatus.

4. The wireless energy receiving apparatus of claim 3, wherein the control unit comprises:
   a frequency calculating unit configured to
      calculate a number of times charging is started by the energy supply apparatus for a predetermined period of time, and
      calculate the frequency that the terminal comes into contact with the energy supply apparatus based on the calculated number of times.

5. The wireless energy receiving apparatus of claim 3, wherein the control unit comprises:
   a frequency calculating unit configured to
      measure a time at which charging of the terminal is started by the energy supply apparatus, and calculate an average value of the frequency that the terminal comes into contact with the energy supply apparatus based on the measured time.

6. The wireless energy receiving apparatus of claim 1, wherein the control unit comprises:
a threshold calculating unit configured to calculate the predetermined threshold to be an energy value corresponding to a maximum ratio of the operation time of the terminal to a first time period from a time at which charging of the terminal is completed once to a time at which next charging of the terminal is completed.

7. The wireless energy receiving apparatus of claim 6, wherein the first time period comprises the operation time of the terminal, or a charging time required to charge the terminal with the energy supplied from the energy supply apparatus, or a charging waiting time required when the terminal waits for the energy supply apparatus to approach the terminal, or any combination thereof.

8. The wireless energy receiving apparatus of claim 7, wherein the charging time comprises a charging preparation time required to synchronize a switch configured to change the state of the resonator of the terminal with an operation switch of the resonator of the energy supply apparatus, or an actual charging time in which the terminal is charged by wirelessly receiving the energy from the energy supply apparatus, or a charging finish time required by the energy supply apparatus to verify the non-resonant state of the resonator of the terminal, or any combination thereof.

9. The wireless energy receiving apparatus of claim 1, further comprising:
a detecting unit configured to detect presence of the energy supply apparatus based on a change in a waveform of energy stored in the resonator of the terminal.

10. The wireless energy receiving apparatus of claim 1, wherein the control unit is further configured to:
additionally connect an impedance to the resonator of the terminal, to change the state of the resonator of the terminal from the resonant state to the non-resonant state to charge a battery of the terminal with the wirelessly received energy.

11. The wireless energy receiving apparatus of claim 1, wherein the control unit comprises:
a threshold calculating unit configured to calculate the predetermined threshold to be a ratio of the energy stored in the terminal to a charging capacity of the terminal.

12. A wireless energy receiving apparatus in a terminal configured to wirelessly receive energy through mutual resonance between a resonator of an energy supply apparatus configured to supply the energy and a resonator of the terminal, the wireless energy receiving apparatus comprising:
an energy measuring unit configured to measure an amount of energy stored in the terminal;
a threshold calculating unit configured to calculate a predetermined threshold based on a frequency that the terminal comes into contact with the energy supply apparatus, a charging capacity of the terminal, and an energy consumption rate of the terminal;
a control unit configured to change a state of the resonator of the terminal from a non- resonant state to a resonant state based on the measured amount of energy and the predetermined threshold.

13. A wireless energy transmitting apparatus in a terminal configured to wirelessly transmit energy through mutual resonance between a resonator of the terminal and a resonator of an energy receiving apparatus configured to receive the energy, the wireless energy transmitting apparatus comprising:
a detecting unit configured to detect the energy receiving apparatus based on a change in a waveform of energy stored in the terminal; and
a control unit configured to calculate a predetermined threshold based on a frequency that the terminal comes into contact with the detected energy receiving apparatus,
wherein a state of the resonator of the detected energy receiving apparatus is changed from a non-resonant state to a resonant state by comparing an amount of energy stored in the detected energy receiving apparatus with the predetermined threshold.

14. The wireless energy transmitting apparatus of claim 13, wherein the control unit comprises:
a frequency calculating unit configured to
calculate a number of times charging of the detected energy receiving apparatus is started by the terminal for a predetermined period of time, and
calculate the frequency based on the calculated number of times.

15. The wireless energy transmitting apparatus of claim 13, further comprising:
a transmitting unit configured to transmit the predetermined threshold to the detected energy receiving apparatus.

16. A wireless energy receiving method in a terminal configured to wirelessly receive energy through mutual resonance between a resonator of an energy supply apparatus configured to supply the energy and a resonator of the terminal, the wireless energy receiving method comprising:
measuring an amount of energy stored in the terminal; and
changing a state of the resonator of the terminal from a non-resonant state to a resonant state by comparing the measured amount of energy with a predetermined threshold,
wherein the predetermined threshold is determined based on a frequency that the terminal comes into contact with the energy supply apparatus.

17. The wireless energy receiving method of claim 16, further comprising:
calculating the predetermined threshold based on the frequency that the terminal comes into contact with the energy supply apparatus, and a ratio of the operation time of the terminal to a charging time required to charge the terminal with the energy supplied from the energy supply apparatus.

18. The wireless energy receiving method of claim 17, further comprising:
calculating a number of times charging is started by the energy supply apparatus for a predetermined period of time; and
calculating the frequency that the terminal comes into contact with the energy supply apparatus based on the calculated number of times.

19. A non-transitory computer-readable storage medium storing a program comprising instructions to cause a computer to perform the wireless energy receiving method of claim 16.

20. A wireless energy receiving method in a terminal configured to wirelessly receive energy through mutual resonance between a resonator of an energy supply apparatus configured to supply the energy and a resonator of the terminal, the wireless energy receiving method comprising:

measuring an amount of energy stored in the terminal;
calculating a predetermined threshold based on a frequency that the terminal comes into contact with the energy supply apparatus, a charging capacity of the terminal, and an energy consumption rate of the terminal; and
changing a state of the resonator of the terminal from a non-resonant state to a resonant state based on the measured amount of energy and the predetermined threshold.

* * * * *